United States Patent [19]
Nakamura et al.

[11] Patent Number: 4,532,071
[45] Date of Patent: Jul. 30, 1985

[54] PROCESS FOR THE PREPARATION OF PHOSPHOR

[75] Inventors: Takashi Nakamura; Kenji Takahashi, both of Kaisei, Japan

[73] Assignee: Fuji Photo Film Co., Ltd., Kanagawa, Japan

[21] Appl. No.: 525,460

[22] Filed: Aug. 22, 1983

[30] Foreign Application Priority Data

Aug. 24, 1982 [JP] Japan ................................. 57-145489

[51] Int. Cl.$^3$ .......................................... C09K 11/465
[52] U.S. Cl. ............................................. 252/301.4 H
[58] Field of Search ................................ 252/301.4 H

[56] References Cited

U.S. PATENT DOCUMENTS 4,157,981 6/1979 Stevels et al. ............... 252/301.4 H

FOREIGN PATENT DOCUMENTS 19880 12/1980 European Pat. Off. ..... 252/301.4 H

Primary Examiner—Jack Cooper
Attorney, Agent, or Firm—Murray, Whisenhunt & Ferguson

[57] ABSTRACT

A process for the preparation of a divalent europium activated alkaline earth metal fluorohalide phosphor containing a metal oxide, which comprises firing a mixture of starting materials comprising an alkaline earth metal halide, a trivalent europium compound and a metal oxide source, characterized in that said firing is carried out in at least two stages, and at least a portion of said metal oxide source is added to the fired product obtained after the first firing stage.

5 Claims, No Drawings

PROCESS FOR THE PREPARATION OF PHOSPHOR

BACKGROUND OF THE INVENTION

1. Field of the Invention

The present invention relates to a process for the preparation of a phosphor, and more particularly, to a process for the preparation of a divalent europium activated alkaline earth metal fluorohalide phosphor containing a metal oxide.

2. Description of the Prior Art

A divalent europium activated alkaline earth metal fluorohalide phosphor absorbs a radiation such as X-rays with high efficiency and, when exposed to such a radiation, emits near ultraviolet to blue light of high luminance (spontaneous emission). Accordingly, it has been known that said phosphor is employable in a radiographic intensifying screen used in medical radiography for medical diagnosis and in industrial radiography for nondestructive test. Recently, it has been discovered that the divalent europium activated alkaline earth metal fluorohalide phosphor can serve as a stimulable phosphor. That is, when exposed to a radiation such as X-rays, the phosphor absorbs and stores a portion of the radiation energy and emits near ultraviolet to blue light when excited with an electromagnetic wave within a wavelength region of 400-850 nm after exposure to the radiation. This emission is called "stimulated emission". Because of the stimulability thereof, the divalent europium activated alkaline earth metal fluorohalide phosphor has been paid much attention and investigated as a phosphor of a radiation image storage panel employable in a radiation image recording and reproducing method utilizing a stimulable phosphor, for example, as disclosed in Japanese Patent Provisional Publication No. 55(1980)-12429.

When a radiation image storage panel is employed for carrying out medical diagnosis, it is particularly desired that the sensitivity to a radiation of the panel is as high as possible to decrease the exposure dose for patient and to facilitate the procedure for converting the stimulated emission to electric signals. Accordingly, it is desired that the luminance of stimulated emission of the phosphor used for the panel is improved as high as possible. Especially when the radiation is applied to a human body as described above, the enhancement in the luminance of stimulated emission is of much value from the viewpoint of adverse effect of the radiation on the human body. Accordingly, in that case, the enhancement in the luminance is particularly desirable even if the level of the enhancement is not so remarkable.

The divalent europium activated alkaline earth metal fluorohalide phosphor is generally prepared by a process comprising steps of mixing starting materials for a phosphor and firing the resulting mixture for an appropriate period of time at a high temperature. In this process, there is a problem that the resulting phosphor is apt to sinter in the firing step. For this reason, supplemental procedures for pulverizing the fired product and classifying the so pulverized product are needed after the firing step. However, the supplemental pulverizing and classifying procedures remarkably reduce the yield of the phosphor. Further, in the preparation of a phosphor, the sintering phenomenon caused in the firing step generally gives adverse effect to the emission characteristics, particularly to the emission luminance, of the phosphor to be obtained. Accordingly, in the preparation of the divalent europium activated alkaline earth metal fluorohalide phosphor, it is considered that the sintering phenomenon in the firing step likewise gives an adverse effect to the luminance of stimulated emission of the phosphor.

As a method for preventing the sintering phenomenon in the firing step in the process for the preparation of a phosphor, it has been known to add to the mixture of starting materials for the phosphor a metal oxide or a metal compound which can be easily converted into a metal oxide at a high temperature. The application of the above-mentioned method to the preparation of a divalent europium activated alkaline earth metal fluorohalide phosphor has been already known, and accordingly, the divalent europium activated alkaline earth metal fluorohalide phosphor containing a metal oxide prepared by the method is known.

SUMMARY OF THE INVENTION

The present invention provides an improvement of a process for the preparation of a divalent europium activated alkaline earth metal fluorohalide phosphor containing a metal oxide.

That is, a primary object of the invention is to provide a process for the preparation of a divalent europium activated alkaline earth metal fluorohalide phosphor containing a metal oxide which shows stimulated emission of enhanced luminance when exposed to a radiation such as X-rays and then stimulated with an electromagnetic wave within a wavelength region of 400-850 nm.

The present invention provides a process for the preparation of a divalent europium activated alkaline earth metal fluorohalide phosphor containing a metal oxide, which comprises firing a mixture of starting materials comprising an alkaline earth metal halide, a trivalent europium compound and a metal oxide source, charcterized in that said firing is carried out in at least two stages, and at least a portion of said metal oxide source is added to the fired product obtained after the first firing stage.

DETAILED DESCRIPTION OF THE INVENTION

The process for the preparation of a phosphor of the present invention can be suitably utilized in the preparation of a divalent europium activated complex halide phosphor containing a metal oxide, which is an example of the divalent europium activated alkaline earth metal fluorohalide phosphors containing metal oxides. Therefore, the present invention is described below referring to the divalent europium activated complex halide phosphor containing a metal oxide.

The phosphor can be prepared using the following materials (1) to (5):

(1) at least one alkaline earth metal halide selected from the group consisting of $BaF_2$, $CaF_2$ and $SrF_2$;

(2) a halogen donor containing at least one halogen selected from the group consisting of Cl, Br and I;

(3) at least one metal halide selected from the group consisting of:

(i) the alkali metal halide subgroup consisting of LiF, LiCl, LiBr, LiI, NaF, NaCl, NaBr, NaI, KF, KCl, KBr, KI, RbF, RbCl, RbBr, RbI, CsF, CsCl, CsBr and CsI, (ii) the divalent metal halide subgroup consisting of $BeF_2$, $BeCl_2$, $BeBr_2$, $BeI_2$, $MgF_2$, $MgCl_2$, $MgBr_2$ and $MgI_2$, and (iii) the trivalent metal halide subgroup consisting of $AlF_3$, $AlCl_3$, $AlBr_3$, $AlI_3$, $GaF_3$, $GaCl_3$, $GaBr_3$, $GaI_3$, $InF_3$, $InCl_3$, $InBr_3$, $InI_3$, $TlF_3$, $TlCl_3$, $TlBr_3$ and $TlI_3$;

(4) at least one metal oxide source selected from the group consisting of:

(i) the metal oxide subgroup consisting of $BeO$, $MgO$, $CaO$, $SrO$, $BaO$, $ZnO$, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$, and (ii) the metal compound subgroup consisting of metal compounds easily convertible into the abovementioned metal oxides at a high temperature; and (5) a trivalent europium compound such as europium halide, europium oxide, europium nitrate or europium sulfate.

The above-mentioned halogen donor (2) provides at least one halogen selected from the group consisting of Cl, Br and I, which is one constituent element of the resulting phosphor. Examples of the halogen donor employable in the present invention include halides of at least one alkaline earth metal selected from the group consisting of Ba, Ca and Sr with exception of their fluorides; that is, chlorides, bromides and iodides; and ammonium halides with exception of ammonium fluorides; that is, $NH_4Cl$, $NH_4Br$ and $NH_4I$. When the alkaline earth metal halide is employed as the halogen donor, it provides not only at least one halogen selected from the group consisting of Cl, Br and I, but also a part of the alkaline earth metal which is other constituent element of the phosphor.

From the viewpoint of the luminance of stimulated emission of the resulting phosphor, the above-mentioned metal halide (3) is preferably bromide or iodide, and particularly preferred is bromide. The alkali metal constituting the metal halide is preferably Li, Na or K, and particularly preferred is Na. As for the divalent metal, there is no specific preference between Be and Mg, and both can give almost the same results. As for the trivalent metal which belongs to Group IIIa of Periodic Table, Al or Ga is preferred.

In the above-mentioned metal oxide sources (4), examples of the metal compound being easily convertible into a metal oxide at a high temperature include nitrates, carbonates, sulfates and hydroxides of the metals. As for the metal oxide contained in the phosphor, from the viewpoint of prevention of sintering during the firing stage, $MgO$, $CaO$, $Al_2O_3$ and $SiO_2$ are preferred, and from the viewpoint of the luminance of stimulated emission of the resulting phosphor, $Al_2O_3$ and $SiO_2$ are preferred. From the both viewpoints, $SiO_2$ is most preferred.

In the process for the preparation of the phosphor, the above-mentioned alkaline earth metal halide (1), the halogen donor (2), the metal halide (3) and the trivalent europium compound and the metal oxide source (4), if desired are mixed in the stoichiometric ratio corresponding to the formula (I):

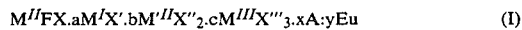

$M^{II}FX \cdot aM^{I}X' \cdot bM'^{II}X''_2 \cdot cM^{III}X'''_3 \cdot xA : yEu$ (I)

in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 0.5$, $0 \leq b \leq 10^{-2}$, $0 \leq c \leq 10^{-2}$ and $a+b+c \geq 10^{-6}$; and x and y are numbers satisfying the conditions of $0 \leq x < 0.5$ and $0 < y \leq 0.2$, respectively.

In the process for the preparation of the phosphor having the above-mentioned formula (I), the preferred numbers for a indicating the content of $M^{I}X'$, b indicating the content of $M'^{II}X''_2$ and c indicating the content of $M^{III}X'''_3$ are in the ranges of $10^{-3} \leq a \leq 0.1$, $0 \leq b \leq 10^{-3}$ and $0 \leq c \leq 10^{-3}$, respectively, from the viewpoint of the enhancement in the luminance of stimulated emission of the resulting phosphor.

In the formula (I), the number for y indicating the amount of divalent europium activator is preferred within the range of $10^{-4} \leq y \leq 3 \times 10^{-2}$, from the viewpoint of the enhancement in the luminance of stimulated emission of the resulting phosphor.

The mixture for the preparation of the phosphor may be prepared by any one of the following methods:

(i) simply mixing the above starting materials (1), (2), (3) and (5), and a portion of the metal oxide source (4), if desired;

(ii) mixing the above starting materials (1) and (2), heating the mixture at a temperature of not less than 100° C. for several hours to produce $M^{II}FX$, and then adding to the $M^{II}FX$ the above starting materials (3) and (5), and a portion of the metal oxide source (4), if desired; and (iii) mixing the above starting materials (1) and (2) in the form of a suspension, drying the suspension under heating (preferably at a temperature of 50°–200° C.) by a drying procedure such as drying under reduced pressure, vacuum drying or spray drying to obtain a dry mixture, and then adding to the dry mixture the above starting materials (3) and (5), and a portion of the metal oxide source (4), if desired.

As a modification of the above-described method (ii), there can be employed a method comprising procedures of mixing the starting materials (1), (2), (3) and (5), and a portion of the metal oxide source (4), if desired, and subjecting the mixture to the above-mentioned heating processing. As a modification of the above-described method (iii), there can be employed a method comprising procedures of mixing the starting materials (1), (2), (3) and (5), and a portion of the metal oxide source (4), if desired, in the form of a suspension and drying the suspension.

In the method (iii) for preparing the mixture for the preparation of the phosphor, when the suspension is dried by the procedure of drying under reduced pressure or vacuum drying, $M^{II}FX$ is produced in the resulting dry mixture. However, when the suspension is dried by a spray drying procedure, $M^{II}FX$ is not produced and a homogeneous powdery mixture having a high flowability is obtained.

In any one of the above-described methods (i), (ii), (iii) and the like, the mixing procedure is carried out using a conventional mixing apparatus such as a variety of mixers, V-type blender, ball mill and rod mill.

Thus prepared mixture is then placed in a heat-resistant container such as a quartz boat, an alumina crucible or a quartz crucible, and fired in an electric furnace (first firing stage). The temperature for the first firing suitably ranges from 600° to 1000° C. The firing period is determined depending upon the amount of the mixture of the starting materials, the firing temperature, etc., and generally ranges from 0.5 to 12 hours, preferably from 0.5 to 5 hours. As the firing atmosphere, there can be employed a weak reducing atmosphere such as a nitrogen gas atmosphere containing a small amount of hydrogen gas or a carbon dioxide gas atmosphere containing carbon monoxide gas. In the first firing stage, the trivalent europium contained in the mixture is reduced into divalent europium under the weak reducing atmosphere.

The product obtained by the first firing stage carried out under the above-mentioned conditions is taken out of the furnace, allowed to stand for cooling and pulverized. The pulverizing procedure is carried out using a conventional pulverizing apparatus such as a mortar, ball mill, tube mill or a centrifugal mill.

To the product of the first firing stage is then added the remaining or whole amount of the above-mentioned metal oxide source (4), and then these are mixed well. From the viewpoints of both the prevention of sintering and the enhancement of the luminance of stimulated emission of the resulting phosphor, it is desired that the amount of the metal oxide contained in the resulting phosphor, which is expressed by mol. of the metal oxide per 1 mol. of alkaline earth metal fluorohalide ($M^{II}FX$) and indicated by $x'$ in the formula (I), and which corresponds to the total of the amount of the metal oxide source added to the mixture of starting materials prior to the first firing stage and the amount thereof added to the fired product after the first firing stage, is within the range of $0 < x' \leq 0.5$, and preferably of $10^{-5} \leq x' \leq 0.5$. From the viewpoint of the luminance of stimulated emission of the phosphor, the particularly preferred number for $x'$ is within the range of $10^{-3} \leq x' \leq 0.1$. The luminance of stimulated emission is apt to deteriorate when $x'$ is too large.

The metal oxide source is generally added to the fired product obtained after the first firing stage in an amount of not less than 1/500 of the amount thereof added to the mixture of the starting materials prior to the first firing stage. From the viewpoint of enhancement of the luminance of stimulated emission of the resulting phosphor, the amount of the metal oxide source to be added to the fired product after the first firing stage is preferably the same or more than the amount thereof added to the mixture of starting materials prior to the first firing stage, and particularly preferred is that the whole amount of metal oxide source is added to the fired product obtained after the first firing stage.

Further, the whole amount of the metal halide (3) is not necessarily added to the mixture of starting materials for the phosphor prior to the first firing stage, and a portion of the metal halide may be added to the fired product obtained after the first firing stage.

The mixture of the pulverized product and the metal oxide source added thereto is placed in a heat-resistant container and fired in the electric furnace (second firing stage). In the second firing stage, the temperature of the firing suitably ranges from 500° to 800° C. and the firing period suitably ranges from 0.5 to 12 hours, and preferably from 0.5 to 5 hours. For carrying out the second firing stage, there can be employed an inert atmosphere such as a nitrogen gas atmosphere or an argon gas atmosphere, as well as the above-mentioned weak reducing atmosphere.

Upon the second firing stage is complete, a powdery phosphor is obtained. Thus obtained powdery phosphor may be further fired under the above-mentioned second firing conditions. When the firing is carried out more than twice, the remaining or whole amount of the metal oxide source can be added to the fired product obtained by any time firing stage except the last stage.

The phosphor obtained above is a powder showing no sintering, because of the sintering-preventing effect of the metal oxide contained in the phosphor. Accordingly, it is not necessary to pulverize and classify the firing product obtained after the second firing stage. The powdery phosphor may be processed in a conventional manner involving a variety of procedures for the preparation of phosphors such as a washing procedure, a drying procedure and a sieving procedure.

The phosphor prepared by the above-described procedure according to the present invention is a divalent europium activated complex halide phosphor containing a metal oxide having the formula (II):

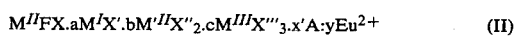

$$M^{II}FX \cdot aM^{I}X' \cdot bM'^{II}X''_2 \cdot cM^{III}X'''_3 \cdot x'A : yEu^{2+} \qquad (II)$$

in which $M^{II}$, $M^{I}$, $M'^{II}$, $M^{III}$, A, X, X', X'', X''', a, b, c and y have the same meanings as defined in the formula (I); and $x'$ is a number satisfying the condition of $0 < x' \leq 0.5$.

The phosphor obtained by the above-mentioned process exhibits stimulated emission of enhanced luminance.

As for other divalent europium activated alkaline earth metal fluorohalide phosphors containing metal oxide, the luminance of stimulated emission thereof can be likewise enhanced by carrying out the firing stage at least twice and adding at least a portion of the metal oxide source to the fired product obtained after the first firing stage.

In the present invention, the term "divalent europium activated alkaline earth metal fluorohalide phosphor(s) containing metal oxide" means phosphors such as a divalent europium activated complex halide phosphor containing a metal oxide, and a divalent europium activated alkaline earth metal fluorohalide phosphor containing a metal oxide having the above-mentioned formula (II) in which each number of a, b and c equals 0 and the like.

The sintering of the product occurring during the firing stage can be effectively prevented by addition of the metal oxide source in the manner according to the present invention, as well as to the known method. As a result, the decrease of luminance of stimulated emission of the resulting phosphor caused by the sintering can be sufficiently prevented.

The phosphor prepared by the process of the invention also exhibits spontaneous emission of enhanced luminance when exposed to a radiation such as X-rays, and further shows an improved afterglow characteristics after the exposure to the radiation is terminated. Accordingly, the phosphor prepared by the process of the invention is also preferably employable in a radiographic intensifying screen.

The present invention will be illustrated by the following examples, but these examples by no means restrict the invention.

EXAMPLE 1

175.4 g. of barium fluoride ($BaF_2$) and 333.3 g. of barium bromide ($BaBr_2 \cdot 2H_2O$) were mixed well using an agate mortar for 30 min. and heated at 150° C. for 2 hours to produce barium fluorobromide (BaFBr). To the barium fluorobromide was added a hydrobromic acid solution (HBr; 47 weight %) containing 0.352 g. of europium oxide ($Eu_2O_3$), and the resultant was mixed well to give a suspension. The suspension was dried at 130° C. under reduced pressure for 2 hours. The dried product was pulverized using an automortar made of highly pure alumina for 1 hour to obtain a mixture of barium fluorobromide and europium bromide ($EuBr_3$). To the mixture was added 0.617 g. of sodium bromide and the resultant was mixted to prepare a mixture of starting materials for a phosphor.

100 g. of the mixture of starting materials was then placed in a quartz boat, which was, in turn, placed in a tubular furnace for carrying out the first firing. The first firing was conducted at 900° C. for 2 hours in a stream of nitrogen gas containing 3 weight % of hydrogen gas flowing at the rate of 300 ml/min. After the firing was complete, thus fired product was taken out of the furnace and allowed to stand for cooling.

Subsequently, the product obtained in the above first firing stage was pulverized for 20 hours by means of an alumina ball mill. To the pulverized fired product was then added 0.1 g. of silicon dioxide (0.0039 mol.: mol. per 1 mol. of barium fluorobromide; the same expression is employed in the examples hereinafter), and the resultant was mixed using a V-type blender. The mixture was again placed in a quartz boat and fired in a tubular furnace for carrying out the second firing. The second firing was conducted at 600° C. for 2 hours in the same stream as employed in the first firing stage. After the second firing stage was complete, the fired product was taken out of the furnace and allowed to stand for cooling to obtain a powdery divalent europium activated complex halide phosphor containing $SiO_2$ (BaFBr.0.003NaBr.0.0039$SiO_2$:0.001$Eu^{2+}$).

EXAMPLE 2

The procedure of Example 1 was repeated except that a mixture of starting materials for a phosphor was prepared by adding 0.473 g. of silicon dioxide (0.0039 mol.) in addition of 0.617 g. of sodium bromide to the mixture of barium fluorobromide and europium bromide, to obtain a powdery divalent europium activated complex halide phosphor containing $SiO_2$ (BaFBr.0.003NaBr. 0.0078$SiO_2$:0.001$Eu^{2+}$).

COMPARISON EXAMPLE 1

The procedure of Example 1 was repeated except that the addition of silicon dioxide to the product of the first firing stage was omitted, to obtain a powdery divalent europium activated complex halide phosphor (BaFBr.0.003NaBr:0.001$Eu^{2+}$).

COMPARISON EXAMPLE 2

The procedure of Example 1 was repeated except that 0.473 g. of silicon dioxide (0.0039 mol.) in addition of 0.617 g. of sodium bromide was added to the mixture of barium fluorobromide and europium bromide to prepare a mixture of starting materials for a phosphor, and that the addition of silicon dioxide to the product of the first firing stage was omitted, to obtain a powdery divalent europium activated complex halide phosphor containing $SiO_2$ (BaFBr.0.003NaBr.0.0039$SiO_2$:0.001$Eu^{2+}$).

The phosphors prepared in Examples 1 and 2 and Comparison Examples 1 and 2 were measured on the luminance of stimulted emission when excited with an He-Ne laser (oscillation wavelength: 632.8 nm) after exposure to X-rays at the voltage of 80 KVp, to evaluate the luminance of stimulated emission thereof.

The results on the evaluation of the phosphors are set forth in Table 1. The amount of $SiO_2$ introduced into the phosphor is expressed in a molar ratio to 1 mol. of barium fluorobromide (BaFBr).

TABLE 1

| | Amount of $SiO_2$ | | Relative |
|---|---|---|---|
| | Before FF | After FF | Luminance |
| Example 1 | 0 | 0.0039 | 140 |
| 2 | 0.0039 | 0.0039 | 130 |
| Com. Ex. 1 | 0 | 0 | 100 |
| 2 | 0.0039 | 0 | 120 |

Remark: Before FF means "$SiO_2$ added in the stage of preparation of the mixture before the first firing stage", and After FF means "$SiO_2$ added after the first firing stage"; same hereinafter.

EXAMPLE 3

The procedure of Example 1 was repeated except that 0.3 g. of silicon dioxide (0.012 mol.) was added to the product of the first firing stage, to obtain a powdery divalent europium activated complex halide phosphor containing $SiO_2$(BaFBr.0.003NaBr.0.012$SiO_2$:0.001$Eu^{2+}$).

EXAMPLE 4

The procedure of Example 1 was repeated except that a mixture of starting materials for a phosphor was prepared by adding 1.418 g. of silicon dioxide (0.012 mol.) in addition of 0.617 g. of sodium bromide to the mixture of barium fluorobromide and europium bromide, to obtain a powdery divalent europium activated complex halide phosphor containing $SiO_2$(BaFBr.0.003NaBr.0.016$SiO_2$:0.001$Eu^{2+}$).

EXAMPLE 5

The procedure of Example 1 was repeated except that 1.0 g. of silicon dioxide (0.039 mol.) was added to the product of the first firing stage, to obtain a powdery divalent europium activated complex halide phosphor containing $SiO_2$(BaFBr.0.003NaBr.0.039$SiO_2$:0.001$Eu^{2+}$).

COMPARISON EXAMPLE 3

The procedure of Example 1 was repeated except that 1.418 g. of silicon dioxide (0.012 mol.) in addition of 0.617 g. of sodium bromide was added to the mixture of barium fluorobromide and europium bromide to prepare a mixture of starting materials for a phosphor and that the addition of silicon dioxide to the product of the first firing stage was omitted, to obtain a powdery divalent europium activated complex halide phosphor containing $SiO_2$(BaFBr.0.003NaBr.0.012$SiO_2$:0.001$Eu^{2+}$).

The phosphors prepared in Examples 3 through 5 and Comparison Example 3 were measured on the luminance of stimulated emission when excited with an He-Ne laser (oscillation wavelength: 632.8 nm) after exposure to X-rays at the voltage of 80 KVp, to evaluate the luminance of stimulated emission thereof.

The results on the evaluation of the phosphors are set forth in Table 2. The aforementioned result on the evaluation of the phosphor prepared in Comparison Example 1 is also set forth in Table 2. The amount of $SiO_2$ introduced into the phosphor is expressed in a molar ratio to 1 mol. of BaFBr.

TABLE 2

|  | | Amount of SiO$_2$ | | Relative Luminance |
|---|---|---|---|---|
|  | | Before FF | After FF | |
| Example | 3 | 0 | 0.012 | 110 |
|  | 4 | 0.012 | 0.0039 | 90 |
|  | 5 | 0 | 0.039 | 100 |
| Com. Ex. | 3 | 0.012 | 0 | 80 |
|  | 1 | 0 | 0 | 100 |

EXAMPLE 6

The procedure of Example 1 was repeated except for adding 0.1 g. of aluminium oxide (Al$_2$O$_3$; 0.0023 mol.) instead of 0.1 g. of silicon dioxide (0.0039 mol.) to the product of the first firing stage, to obtain a powdery divalent europium activated complex halide phosphor containing Al$_2$O$_3$(BaFBr.0.003NaBr.0.0023Al$_2$O$_3$:0.001Eu$^{2+}$).

EXAMPLE 7

The procedure of Example 1 was repeated except for adding 0.1 g. of magnesium oxide (MgO; 0.0059 mol.) instead of 0.1 g. of silicon dioxide (0.0039 mol.) to the product of the first firing stage, to obtain a powdery divalent europium activated complex halide phosphor containing MgO(BaFBr.0.003NaBr.0.0059MgO:0.001Eu$^{2+}$).

EXAMPLE 8

The procedure of Example 1 was repeated except for adding 0.1 g. of calcium oxide (CaO; 0.0042 mol.) instead of 0.1 g. of silicon dioxide (0.0039 mol.) to the product of the first firing stage, to obtain a powdery divalent europium activated complex halide phosphor containing CaO(BaFBr.0.003NaBr.0.0042CaO:0.001Eu$^{2+}$).

The phosphors prepared in Examples 6 through 8 were measured on the luminance of stimulated emission when excited with an He-Ne laser (oscillation wavelength: 632.8 nm) after exposure to X-rays at the voltage of 80 KVp, to evaluate the luminance of stimulated emission thereof.

The results on the evaluation of the phosphors are set forth in Table 3. The aforementioned result on the evaluation of the phosphor prepared in Comparison Example 1 is also set forth in Table 3. The amount of the metal oxide introduced into the phosphor is expressed in a molar ratio to 1 mol. of BaFBr.

TABLE 3

|  |  | Metal Oxide | Amount Added To Fired Product | Relative Luminance |
|---|---|---|---|---|
| Example | 6 | Al$_2$O$_3$ | 0.0023 | 110 |
|  | 7 | MgO | 0.0059 | 120 |
|  | 8 | CaO | 0.0042 | 120 |
| Com. Ex. | 1 | None | 0 | 100 |

EXAMPLE 9

The procedure of Example 1 was repeated except that a mixture of starting materials for a phosphor was prepared by adding 1.01 g. of beryllium bromide instead of 0.617 g. of sodium bromide to the mixture of barium fluorobromide and europium bromide, to obtain a powdery divalent europium activated complex halide phosphor containing SiO$_2$(BaFBr.0.003BeBr$_2$.0.0039SiO$_2$:0.001Eu$^{2+}$).

EXAMPLE 10

The procedure of Example 1 was repeated except that a mixture of starting materials for a phosphor was prepared by adding 1.60 g. of aluminium bromide instead of 0.617 g. of sodium bromide to the mixture of barium fluorobromide and europium bromide, to obtain a powdery divalent europium activated complex halide phosphor containing SiO$_2$(BaFBr.0.003AlBr$_3$.0.0039SiO$_2$:0.001Eu$^{2+}$).

The phosphors prepared in Examples 9 and 10 were measured on the luminance of stimulated emission when excited with an He-Ne laser (oscillation wavelength: 632.8 nm) after exposure to X-rays at the voltage of 80 KVp, to evaluate the luminance of stimulated emission thereof.

The results on the evaluation of the phosphors are set forth in Table 4. The aforementioned result on the evaluation of the phosphor prepared in Example 1 is also set forth in Table 4. The amount of the metal halide is expressed in a molar ratio to 1 mol. of BaFBr.

TABLE 4

|  |  | Metal Halide | Amount Added | Relative Luminance |
|---|---|---|---|---|
| Example | 9 | BeBr | 0.003 | 120 |
|  | 10 | AlBr$_3^2$ | 0.003 | 120 |
|  | 1 | NaBr | 0.003 | 140 |

We claim:
1. A process for the preparation of a divlanet europium activated alkaline earth metal fluorohalide phosphor containing a metal oxide, said phosphor having the formula:

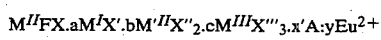

$$M^{II}FX.aM^{I}X'.bM'^{II}X''_2.cM^{III}X'''_3.x'A:yEu^{2+}$$

in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide selected from the group consisting of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 0.5$, $0 \leq b \leq 10^{-2}$, $0 \leq c \leq 10^{-2}$ and $a+b+c \geq 10^{-6}$; and x' and y are numbers satisfying the conditions of $0 < x' \leq 0.5$ and $0 < y \leq 0.2$, respectively, which process comprises firing a mixture of starting materials comprising an alkaline earth metal halide, a trivalent europium compound and at least one metal oxide source selected from the group consisting of: a metal oxide subgroup consisting of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$, and a metal compound subgroup consisting of metal compounds easily convertible into said metal oxide under the firing temperature, said firing being carried out in at least two firing stages the fired product from the first firing stage being cooled and pulverized prior to the second firing stage, with the first firing stage being carried out at a temperature of about 600° to 1000° C.

under a weak reducing atmosphere for a period of about 0.5 to 12 hours to effect reduction of trivalent europium to divalent europium, and with the second firing stage being carried out at a temperature of about 500° to 800° C. under a weak reducing atmosphere or an inert atmosphere for a period of about 0.5 to 12 hours, said metal oxide source being added prior to the first firing stage and after the first firing stage, with the amount of said metal oxide source added to the fired product of the first firing stage being not less than 1/500 of the amount of said metal oxide source added to said mixture of starting materials prior to the first firing stage, the total amount of metal oxide source added being sufficient to prevent sintering and to enhance the stimulated emission of the resultant phosphor.

2. A process claimed in claim 1, in which not less than half of the amount of the metal oxide source is added to the fired product obtained after the first firing stage.

3. A process for the preparation of a divalent europium activated alkaline earth metal fluorohalide phosphor containing a metal oxide, said phosphor having the formula:

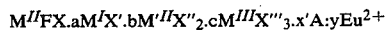

$$M^{II}FX \cdot aM^{I}X' \cdot bM'^{II}X''_2 \cdot cM^{III}X'''_3 \cdot x'A : yEu^{2+}$$

in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; X is at least one halogen selected from the group consisting of Cl, Br and I; each of X', X" and X''' is at least one halogen selected from the group consisting of F, Cl, Br and I; a, b and c are numbers satisfying the conditions of $0 \leq a \leq 0.5$, $0 \leq b \leq 10^{-2}$, $0 \leq c \leq 10^{-2}$ and $a+b+c \geq 10^{-6}$; and x' and y are numbers satisfying the conditions of $0 < x' \leq 0.5$ and $0 < y \leq 0.2$, respectively, which process comprises firing a mixture of starting materials comprising an alkaline earth metal halide, a trivalent europium compound and at least one metal oxide source selected from the group consisting of: a metal oxide subgroup consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$, and a metal compound subgroup consisting of metal compounds easily convertible into said metal oxide under the firing temperature, said firing being carried out in at least two firing stages the fired product from the first firing stage being cooled and pulverized prior to the second firing stage, with the first firing stage being carried out at a temperature of about 600° to 1000° C. under a weak reducing atmosphere for a period of about 0.5 to 12 hours to effect reduction of trivalent europium to divalent europium, and with the second firing stage being carried out at a temperature of about 500° to 800° C. under a weak reducing atmosphere or an inert atmosphere for a period of about 0.5 to 12 hours, the entire amount of the metal oxide source being added to the fired product obtained after the first firing stage, the total amount of metal oxide source added being sufficient to prevent sintering and to enhance the stimulated emission of the resultant phosphor.

4. A process as claimed in claim 1 or 3, in which A in the formula is at least one metal oxide selected from the group consisting of magnesium oxide, calcium oxide, aluminum oxide and silicon dioxide.

5. A process claimed in claim 3, in which A in the formula is at least one metal oxide selected from the group consisting of alumium oxide and silicon dioxide.

* * * * *